United States Patent
Lim et al.

(10) Patent No.: US 9,521,719 B2
(45) Date of Patent: Dec. 13, 2016

(54) CIRCUIT FOR DRIVING LIGHTING APPARATUS AND METHOD THEREOF

(71) Applicant: Magnachip Semiconductor, Ltd., Cheongju-si (KR)

(72) Inventors: Gyu Ho Lim, Cheongju-si (KR); Tae Il Yun, Cheongju-si (KR); Beom Seon Ryu, Cheongju-si (KR)

(73) Assignee: MagnaChip Semiconductor, Ltd. (KR)

( * ) Notice: Subject to any disclaimer, the term of this patent is extended or adjusted under 35 U.S.C. 154(b) by 0 days.

(21) Appl. No.: 14/813,439

(22) Filed: Jul. 30, 2015

(65) Prior Publication Data

US 2016/0081158 A1   Mar. 17, 2016

(30) Foreign Application Priority Data

Sep. 15, 2014   (KR) .................. 10-2014-0122132

(51) Int. Cl.
*H05B 33/08* (2006.01)

(52) U.S. Cl.
CPC ................. *H05B 33/0818* (2013.01)

(58) Field of Classification Search
None
See application file for complete search history.

(56) References Cited

U.S. PATENT DOCUMENTS

2014/0320099 A1*  10/2014  Chen .................. H02M 1/4225
                                                          323/282
2015/0237689 A1*  8/2015   Yang ................. H05B 33/0809
                                                          315/200 R

\* cited by examiner

*Primary Examiner* — Dedei K Hammond
(74) *Attorney, Agent, or Firm* — McGuireWoods LLP (57) ABSTRACT

A circuit for driving a lighting apparatus is provided. The circuit includes a valley signal generator configured to generate a valley signal based on an input voltage, an input voltage determining unit configured to determine whether the input voltage corresponds to a direct voltage or a full-wave rectified AC voltage based on the valley signal, an AC voltage simulation unit configured to generate a virtual valley signal when the input voltage is a DC voltage, and a switching device controller configured to control a switching device used to drive an LED module based the determination and at least one of the valley signal and virtual valley signal.

14 Claims, 6 Drawing Sheets

CIRCUIT FOR DRIVING LIGHTING APPARATUS AND METHOD THEREOF

CROSS-REFERENCE TO RELATED APPLICATIONS

The present application claims priority from Korean Patent Application No. 10-2014-0122132, filed in the Korean Intellectual Property Office on Sep. 15, 2014, the contents of which are hereby incorporated by reference in their entirety.

BACKGROUND

1. Field

The present invention relates to a lighting apparatus driving technology, and more specifically, to a lighting apparatus driving circuit and method, capable of driving a lighting apparatus that receives an AC or DC voltage without a separate apparatus.

2. Description of the Related Art

Light Emitting Diode (LED) lighting equipment may reduce power consumption compared to other known light sources in the art while still producing a similar amount of illumination. Accordingly, the LED lighting equipment may be used as a substitute or in addition to conventional lighting fixtures. In order to drive the LED lighting equipment, a lighting apparatus driving circuit may be used which may receive either a DC or AC input voltage.

Such a lighting apparatus driving circuit may improve weight and spatial requirements of the LED lighting equipment. However, when the lighting apparatus, which uses an AC input voltage, receives a DC input voltage it may not operate normally because of an overload. Accordingly, in order to provide a lighting apparatus that operates normally, whether it receives an AC voltage or DC input voltage, a separate apparatus is needed and included in the lighting equipment known in the art. As a result, when the separate apparatus is added, the LED lighting equipment suffers additional weight and spatial limitations due to the duplicative nature of including the lighting apparatus driving circuits as known in the art.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a circuit for driving a lighting apparatus, including a valley signal generator configured to generate a valley signal based on an input voltage, an input voltage determining unit configured to determine whether the input voltage corresponds to a direct voltage or a full-wave rectified AC voltage based on the valley signal, an AC voltage simulation unit configured to generate a virtual valley signal when the input voltage is a DC voltage, and a switching device controller configured to control a switching device used to drive an LED module based the determination and at least one of the valley signal and virtual valley signal.

The circuit for driving a lighting apparatus may further include a driving voltage controller configured to receive a reference voltage from outside and a driving voltage from a driving current sensing device, and to control the driving voltage based on the reference voltage.

The valley signal generator may include an input voltage detection module configured to receive an input signal from an external power supply to detect the input voltage, a comparison module configured to compare the input voltage having a first voltage range and an internal reference voltage having a second voltage range to output a voltage having a third voltage range, and a noise removal module configured to receive an output voltage of the comparison module and an internal clock signal, and remove noise from the valley signal through a plurality of noise filters at each period of the internal clock signal.

The valley signal generator may be further configured to generate a first valley signal that is output in a high level and a low level when the input voltage corresponds to an AC voltage, and a second valley signal that is output in a high level when the input voltage corresponds to a DC voltage.

The AC voltage simulation unit may be further configured to substitute the virtual valley signal for the second valley signal.

The switching device controller may be further configured to enable a driving current to flow to an inductor when the switching device is turned on, and enable a current charged in the inductor to flow to an LED module through a diode when the switching device is turned off.

According to an aspect of another exemplary embodiment, there is provided a method for driving a lighting apparatus, including generating a valley signal based on an input voltage, determining whether the input voltage corresponds to a direct voltage or a full-wave rectified AC voltage based on the valley signal, generating a virtual valley signal when the input voltage is a DC voltage, and controlling a switching device used to drive an LED module based the determination and at least one of the valley signal and virtual valley signal.

The method for driving a lighting apparatus may further include receiving a reference voltage from outside and a driving voltage from a driving current sensing device to control the driving voltage based on the reference voltage.

Generating a valley signal based on an input voltage may include receiving an input signal from an external power supply to detect the input voltage, comparing the input voltage having a first voltage range and an internal reference voltage having a second voltage range to output a voltage having a third voltage range, and receiving the output voltage having the third voltage range and an internal clock signal, and removing noise from the valley signal through a plurality of noise filters.

Controlling the switching device used to drive an LED module based the determination and at least one of the valley signal and virtual valley signal may include enabling a driving current to flow to an inductor when the switching device is turned on, and enabling a current charged in the inductor to flow to an LED module through a diode when the switching device is turned off.

Other aspects and advantages of the invention will be apparent from the following description and the appended claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Terms described in the present disclosure may be understood as follows.

Terms such as "first" and "second," etc., may be used to distinguish one component from another. Additionally, it will be understood that when an element is referred to as being "connected to" another element, it can be directly connected to the other element or intervening elements may also be present. In contrast, when an element is referred to as being "directly connected to" another element, no intervening elements are present. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification and are not intended to preclude the possibility that one or more other features, numbers, operations, actions, components, parts, or combinations thereof may exist or may be added.

The term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may be combined into a smaller number of components and " . . . units", or further divided into additional components and " . . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

Since the description of an exemplary embodiment of the present invention is merely an exemplary embodiment for structural and functional explanation of the present invention, the scope of a right of the present invention should not be construed to be limited to the exemplary embodiment described in the text of specification but rather only by the claims.

Figure 1:
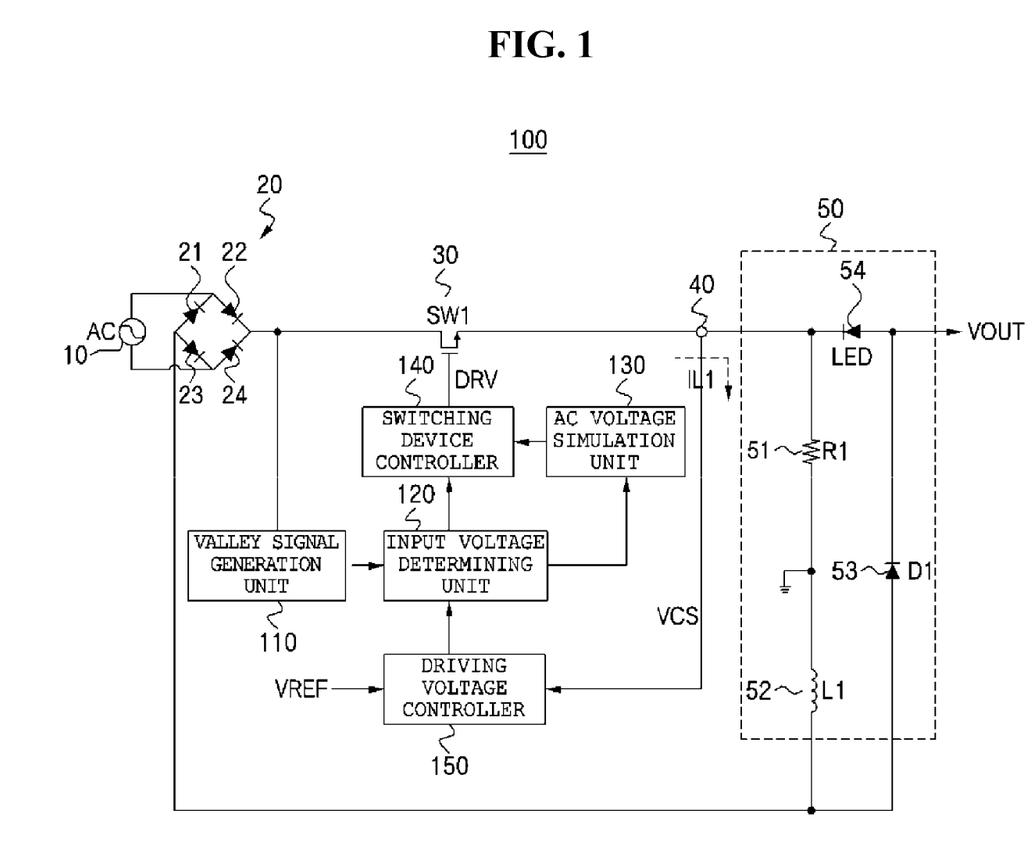
FIG. 1 is a block diagram illustrating a lighting apparatus driving circuit in accordance with an exemplary embodiment of the present disclosure.

FIG. 1 is a block diagram illustrating a lighting apparatus driving circuit in accordance with an exemplary embodiment of the present invention.

Referring to FIG. 1, a lighting apparatus driving circuit 100 in accordance with an exemplary embodiment includes an input power supply 10, a diode bridge 20, a valley signal generation unit 110, an input voltage determining unit 120, an AC voltage simulation unit 130, a switching device controller 140, a driving voltage controller 150, a switching device 30, a driving current sensing device 40 and a lighting unit 50.

The input power supply 10 corresponds to a source of an input voltage VIN. The input voltage VIN may correspond to a DC voltage VDC or AC voltage VAC. When the input voltage VIN corresponds to an AC voltage VAC, a frequency of the AC input voltage VIN may correspond to 50 Hz or 60 Hz depending on the power suppliers, but is not limited thereto. Further, the frequency of the AC input voltage VIN may fluctuate depending on current distribution systems.

The diode bridge 20 may be connected to the input power supply 10, and may connect a plurality of diodes 21 through 24 to one another. When the input voltage VIN corresponds to an AC voltage VAC, the diode bridge 20 may full-wave rectify the AC input voltage VIN. The full-wave rectified AC input voltage VIN may be provided to the valley signal generation unit 110.

Figure 2:
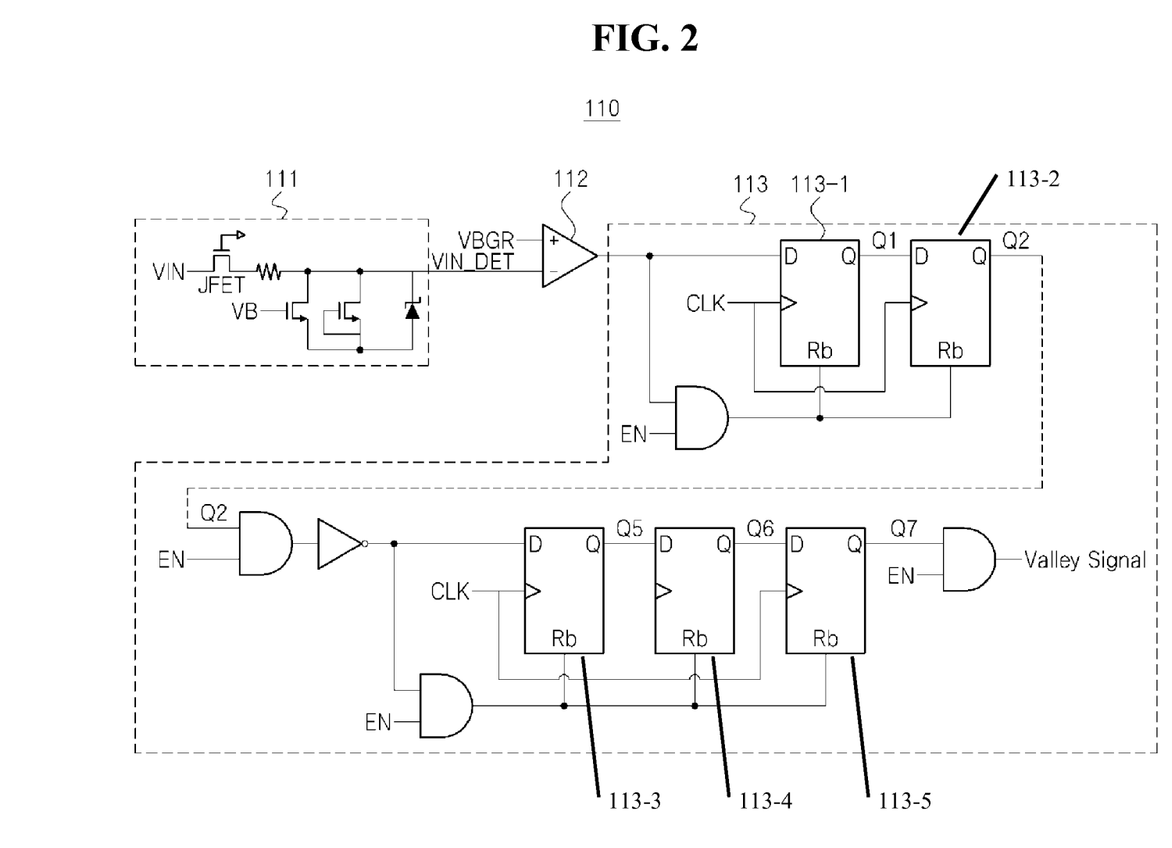
FIG. 2 is a circuit diagram illustrating a valley signal generation unit, similar to that shown in FIG. 1, in accordance with an exemplary embodiment of the present disclosure.

FIG. 2 is a circuit diagram illustrating a valley signal generation unit similar to that shown in FIG. 1. Further, FIG. 5 shows a waveform diagram illustrating an operation of a valley signal generation unit including at least to the one shown in FIG. 2 and other similar units.

Figure 5:
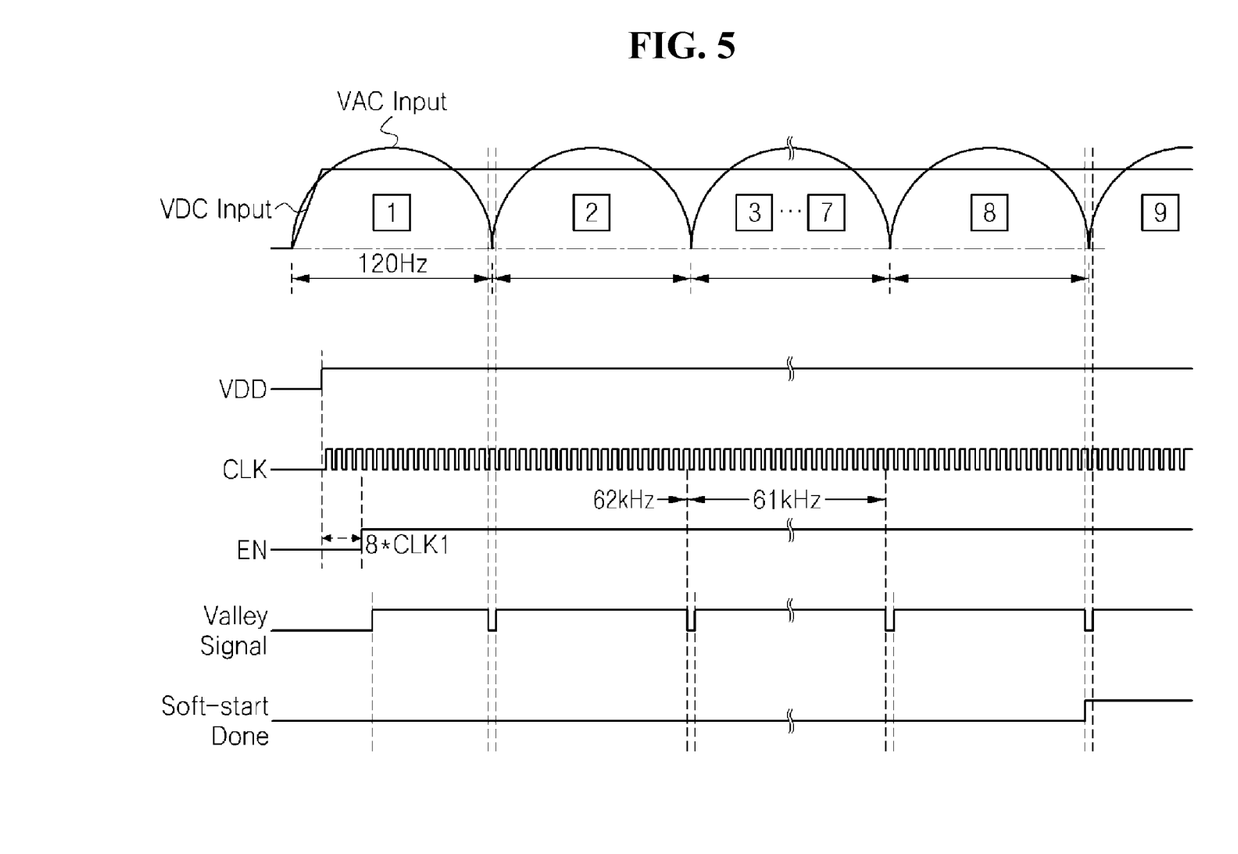
FIG. 5 is a waveform diagram illustrating an operation of a valley signal generation unit, similar to that shown in FIG. 2, in accordance with an exemplary embodiment of the present disclosure.

Referring to FIGS. 2 and 5, the valley signal generation unit 110 may include an input voltage detection module 111, a comparison module 112 and a noise removal module 113.

The valley signal generation unit 110 may be connected to the diode bridge 20 and receive a full-wave rectified AC input voltage VIN. The valley signal generation unit 110 may generate a valley signal based on the received input voltage VIN.

Particularly, the input voltage detection module 111 may receive an input signal VIN from an external power supply (or an input power supply) 10, as shown in FIG. 1, to detect an input voltage VIN_DET.

The comparison module 112, which may be an op-amp comparator, may compare the input voltage VIN_DET having a first voltage region and an internal reference voltage VBGR having a second voltage region to output a voltage having a third voltage region. According to an exemplary embodiment of the present invention, the maximum value of the first voltage region may be higher than that of the second voltage region. That is, the magnitude of the input voltage VIN_DET may be higher or smaller than that of the internal reference voltage VBGR. The internal reference voltage VBGR may play a role to control the input voltage VIN_ DET within a range needed in the lighting apparatus driving circuit 100, but is not necessarily limited thereto.

The noise removal module 113 may receive an output voltage of the comparison module 112 and an internal clock signal CLK to remove any noise from the valley signal through a plurality of noise filters 113-1 through 113-5 each period of the internal clock CLK. The internal clock CLK may have a fixed period, and may be directly generated in the valley signal generation unit 110 or received through an external clock generation circuit (not shown). The noise removal module 113 may receive an enable signal EN to be operated.

When an input signal is applied to the input voltage detection module 111, the lighting apparatus driving circuit 100 may generate a power supply voltage VCC (not shown) needed to drive the circuit. The power supply voltage VCC (not shown) may gradually increase as a capacitor connected to the outside is charged. Further, when the power supply voltage VCC (not shown) becomes a predetermined voltage or more, the lighting apparatus driving circuit 100 may generate a supply voltage VDD to output an enable signal EN. When the enable signal EN is applied, the supply voltage VDD may be supplied to the lighting apparatus driving circuit 100.

According to an exemplary embodiment, the valley signal generation unit 110 may generate a first valley signal that is output in a high level and a low level when the input voltage VIN corresponds to an AC voltage VAC, and a second valley signal that is output in a high level when the input voltage VIN corresponds to a DC voltage VDC. The first valley signal may output a high level when the AC input voltage VIN is a predetermined magnitude or more. That is, when the valley signal generation unit 110 receives a full-wave rectified AC input voltage VIN, it may generate a first valley signal that is output in a low level and a high level corresponding to each period of the AC input voltage VIN.

As show in FIG. 5, according to one or more exemplary embodiments, a wavelength of an AC voltage VAC may have a first period that is 120 Hz. Further, once the AC voltage is fully rectified, there may be provided portions that are at, for example 61 kHz or 62 kHz, that extend between the generated valley signal that trigger on and off as shown in FIG. 5.

Referring to FIG. 1 again, the input voltage determining unit 120 may be connected to the valley signal generation unit 110 to receive a valley signal. The input voltage determining unit 120 may determine whether the input voltage VIN corresponds to a full-wave rectified AC voltage VAC or DC voltage VDC based on the valley signal. In more detail, when the valley signal corresponds to a first valley signal that is output in a high level and a low level, the input voltage determining unit 120 may determine that the input voltage VIN is an AC voltage VAC. Further, when the valley signal corresponds to a second valley signal that is output in a high level, the input voltage determining unit 120 may determine that the input voltage VIN is a DC voltage VDC.

The AC voltage simulation unit 130 may be connected to the input voltage determining unit 120. The AC voltage simulation unit 130 may generate a virtual valley signal when the input voltage VIN is a DC voltage VDC. In more detail, when the input voltage determining unit 120 determines the input voltage VIN as a DC voltage VDC, the AC voltage simulation unit 130 may generate a virtual valley signal as a substitute for a second valley signal. Particularly, according to an exemplary embodiment, the AC voltage simulation unit 130 may generate a virtual valley signal, generating a signal that when combined has the same effect as if the AC voltage VAC had been input. In more detail, the AC voltage simulation unit 130 generates the virtual valley signal with frequencies and amplitudes and overall signal properties that may generate the same effect as an input voltage that has a frequency, specifically an AC voltage, provides when input. Further, the virtual valley signal generated for a DC voltage input may be output in a high level and a low level each predetermined period similar to an AC voltage input.

Accordingly, the lighting apparatus driving circuit 100 may prevent an overload of the lighting apparatus and therefore avoid any damage even when it receives a DC voltage VDC. This is done by the lighting apparatus driving circuit 100 by being able to stop a driving of the circuit based on a valley signal and a virtual valley signal when a voltage input from the external power supply 10 or a current flowing to the circuit becomes excessively high. Further, the lighting apparatus driving circuit 100 may determine whether the LED module 54 is overloaded at each specific period of the valley signal or virtual valley signal, and may continue to operate when there is no overload.

For example, the switching device controller 140 may operate the switching device 30 based on the valley signal or virtual valley signal when the enable signal EN is in a high level.

Figure 3:
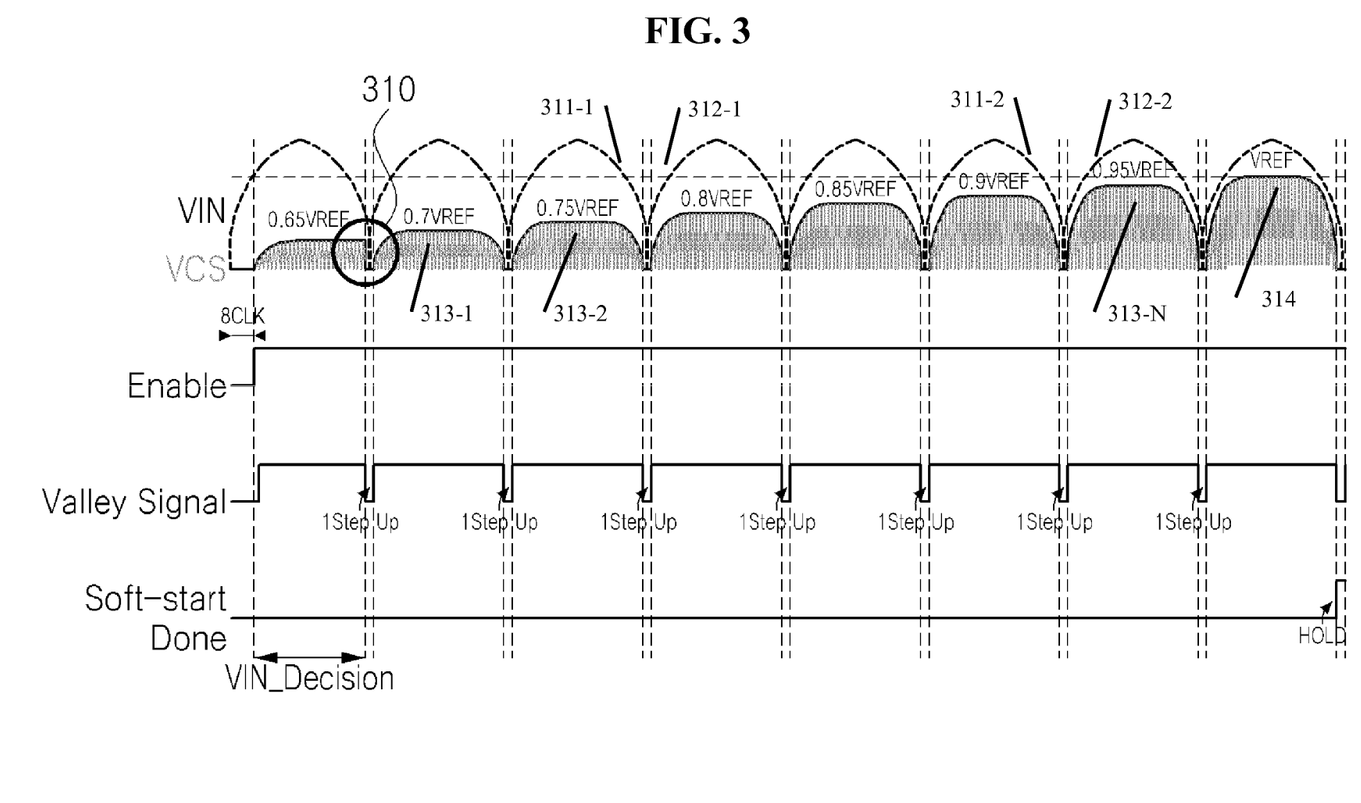
FIG. 3 is a waveform diagram illustrating a signal output according to an AC voltage that is input in a lighting apparatus driving circuit, similar to the one shown in FIG. 1, in accordance with an exemplary embodiment of the present disclosure.

FIG. 3 is a waveform diagram illustrating a signal output according to an AC voltage that is input in a lighting apparatus driving circuit shown in FIG. 1.

According to an exemplary embodiment, at a time point when the valley signal decreases, for example at 311-1 and 311-2 and similar points along the signal (that is, at a time point when a change occurs from a high level to a low level), the switching device controller 140 may stop an operation of the switching device 30, and the switching device 30 may stop turn-on and turn-off operations. Further, at a time point when the valley signal increases, for example at (312-1) and (312-2) and similar points along the signal (that is, at a time point when a change occurs from a low level to a high level), the switching device controller 140 may operate the switching device 30, and the switching device 30 may repeat turn-on and turn-off operations. Further, the reference signal (VREF) may increase step by step at each time point when the valley signal increases, for example (313-1), (313-2) through (313-N), and when the reference voltage VREF reaches the critical point (314), a hold signal (Soft-Start Done) is output so that the reference voltage VREF may have a fixed peak value.

Figure 4:
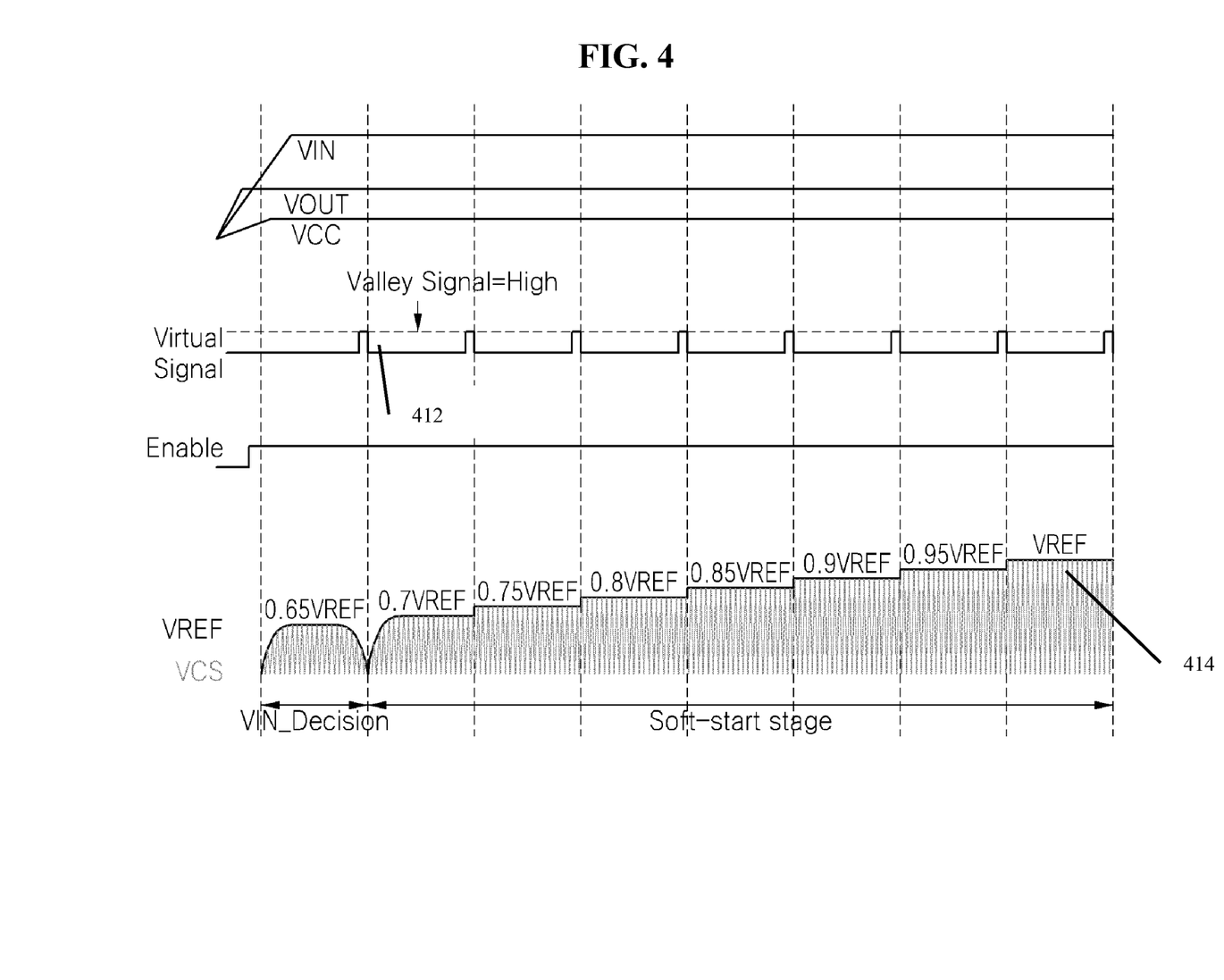
FIG. 4 is a waveform diagram illustrating a signal output according to a DC voltage that is input in a lighting apparatus driving circuit, similar to the one shown in FIG. 1, in accordance with an exemplary embodiment of the present disclosure.

FIG. 4 is a waveform diagram illustrating a signal output according to a DC voltage that is input in a lighting apparatus driving circuit shown in FIG. 1.

According to another exemplary embodiment, at each time point when the virtual valley signal decreases (that is, at each time point when a change occurs from a high level to a low level (412)), the reference voltage VREF may increase step by step, and when the reference voltage VREF reaches the critical point (414), a hold signal (Soft-Start Done) is output so that the reference voltage VREF may have a fixed maximum value.

Referring to FIGS. 1, 3, and 4, the input voltage determining unit 120 may determine whether the input voltage corresponds to a DC voltage or an AC voltage through a VIN_Decision section (that is, a first period). When an input voltage VIN is applied from the external power supply 10, the power supply voltage VCC increases gradually as an external capacitor is charged, and the lighting apparatus driving circuit 100 may output an enable signal EN when the power supply voltage VCC reaches a predetermined voltage or more. When the enable signal EN is applied, the supply voltage VDD is supplied to the lighting apparatus driving circuit 100 so that the lighting apparatus driving circuit 100 may operate normally. When the enable signal EN is applied, the driving voltage controller 150 may receive a driving voltage VCS. Further, when a driving voltage VCS rapidly decreases (310) by the valley signal at the first period, the input voltage determining unit 120 may determine that an AC voltage VAC has been applied. Meanwhile, when the driving voltage VCS is output along a normal AC waveform during the first period, the input voltage determining unit 120 may determine that a direct voltage VDC has been applied.

Referring to FIG. 1 again, the driving voltage controller 150 may be connected to the driving current sensing device 40. The driving voltage controller 150 may receive a reference voltage VREF from the outside and a driving voltage VCS from the driving current sensing device 40, controlling the driving voltage VCS based on the reference voltage VREF. In more detail, a peak value of the reference voltage VREF may increase step by step based on the valley signal or virtual valley signal, and the driving voltage VCS may increase until it reaches the reference voltage VREF. Accordingly, the switching device 30 may be turned-on until the driving voltage VCS reaches the reference voltage VREF, and turned-off at a time point when the driving voltage VCS meets the reference voltage VREF.

The driving current sensing device 40 may be connected between the switching device 30 and lighting unit 50. The driving current sensing device 40 may sense a driving current IL1 to apply a driving voltage VCS to the driving voltage controller 150.

The lighting unit 50 includes a sensing resistor 51, an inductor 52, a diode 53 and an LED module 54.

According to an exemplary embodiment, the driving signal DRV may turn on the switching device 30 when it is in a high level, and turn off the switching device 30 when it is in a low level. The switching device controller 140 may enable the driving current IL1 to flow to the inductor 52 when the switching device 30 is turned on, and a current charged in the inductor 52 to flow to the LED module 54 through the diode 53. In more detail, when the switching device 30 is turned off, the inductor 52 may operate as a current source. A current may flow to the LED module 54 through the diode 53 based on the energy stored in the inductor 52 so that the LED module 54 may be driven. The lighting apparatus may control its output (that is, the driving current IL1), controlling the brightness of the LED module 54.

Figure 6:
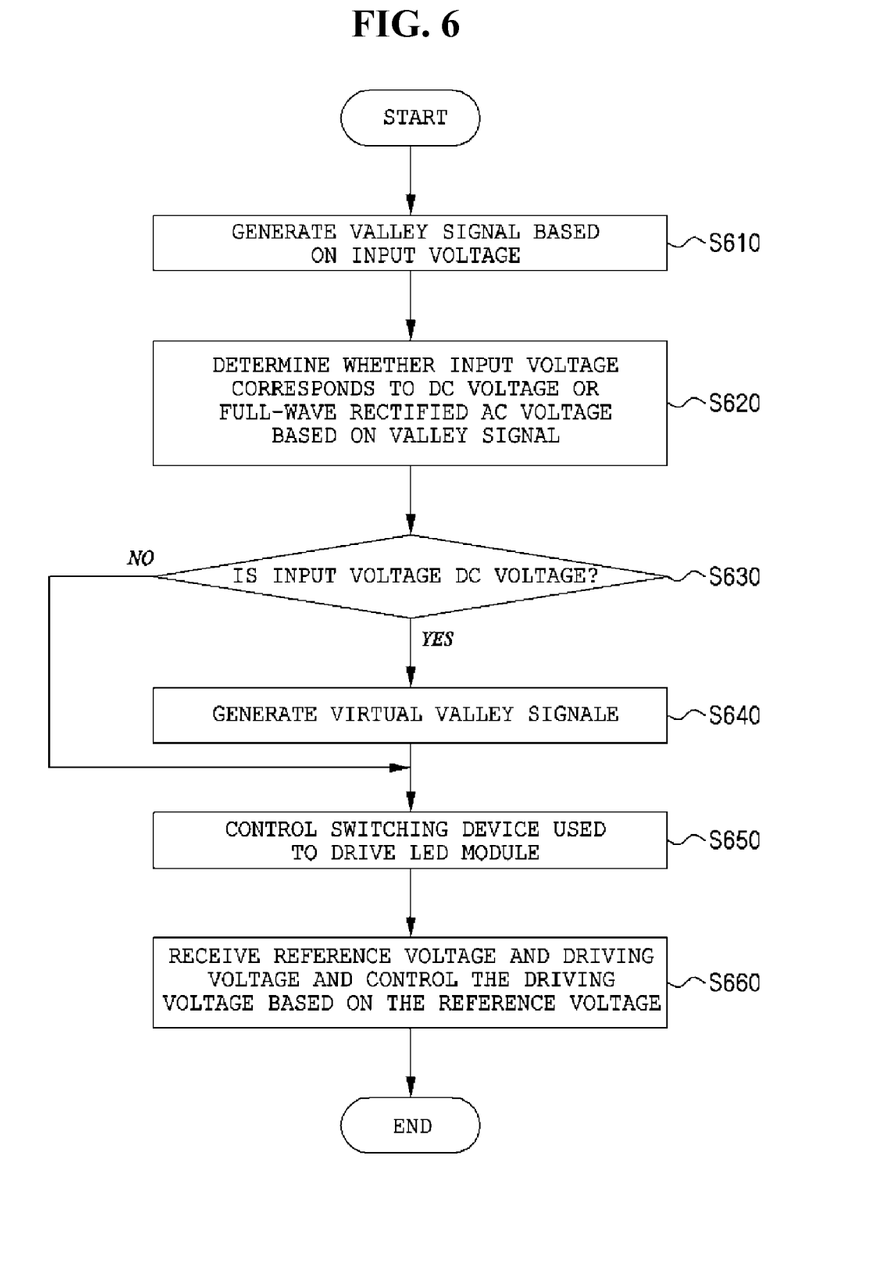
FIG. 6 is a flow chart illustrating a lighting apparatus driving method in accordance with an exemplary embodiment of the present disclosure.

FIG. 6 is a flow chart illustrating a lighting apparatus driving method in accordance with an exemplary embodiment of the present invention.

The valley signal generator 110 may generate a valley signal based on an input voltage VIN. In more detail, the input voltage detection module 111 may receive the input signal VIN from the external power supply 10 to detect the input voltage VIN_DET as shown in FIG. 2. The comparison module 112 may compare the input voltage VIN_DET having a first voltage range and the internal reference voltage VBGR having a second voltage range to output a voltage having a third voltage range. Further, the noise removal module 113 may receive an output voltage of the comparison module 112 and the internal clock module CLK to remove a noise of the valley signal through a plurality of noise filters 113-1 each internal clock signal CLK. As a result, the valley signal generator 110 may generate a valley signal from which noise has been removed (step S610).

The input voltage determining unit 120 may determine whether the input voltage VIN corresponds to a DC voltage VDC or a full-wave rectified AC voltage VAC based on the valley signal. In more detail, the input voltage determining unit 120 may determine the input voltage VIN as an AC voltage VAC when the valley signal corresponds to the first valley signal. Meanwhile, the input voltage determining unit 120 may determine the input voltage VIN as a DC voltage VDC when the valley signal is the second valley signal (step S620).

The input voltage determining unit 120 may transmit a signal to the AC voltage simulation unit 130 when the input voltage VIN is determined as a DC voltage VDC, and a signal to the switching device controller 140 when the input voltage VIN is determined as an AC voltage VAC (step S630).

The AC voltage simulation unit 130 may generate a virtual valley signal when the input voltage VIN is a DC voltage VDC. In more detail, when the input voltage determining unit 120 determines the input voltage VIN as a DC voltage VDC, the AC voltage simulation unit 130 may generate a virtual valley signal to substitute for the second valley signal (step S640).

The switching device controller 140 may operate the switching device 30 based on the valley signal or virtual valley signal when an enable signal EN is in a high level. The switching device controller 140 may enable the driving current IL1 to flow to the inductor 52 when the switching device 30 is turned on, and the current charged in the inductor 52 to flow to the LED module 54 through the diode 53 when the switching device 30 is turned off (step S650).

The driving voltage controller 150 may receive the reference signal VREF from the outside and the driving voltage VCS from the driving current sensing device 40 to control the driving voltage VCS based on the reference voltage VREF. The peak value of the reference voltage VREF may increase step by step based on the valley signal or virtual valley signal, and the driving signal VCS may increase until it reaches the reference voltage VREF (step S660).

Although preferred embodiments of the present disclosure were described above, it would be understood by those skilled in the art that the present invention can be modified or changed in various ways without departing from the technical principles and scope defined by the appended claims.

DESCRIPTION OF SYMBOLS

10: AC input power supply
20: Diode bridge
30: Switching device
40: Driving current sensing device
50: Lighting unit
51: Sensing resistor
52: Inductor
53: Diode
54: LED (Light Emitting Diode)
100: Lighting apparatus driving circuit
110: Valley signal generation unit
111: Input voltage detection module
112: Comparison module
113: Noise removal module
113-1: Noise filter
120: Input voltage determining unit
130: AC voltage simulation unit
140: Switching device controller
150: Driving voltage controller An exemplary embodiment of the present invention tries to drive a lighting apparatus by selecting a DC input voltage or AC input voltage automatically without any separate apparatus.

Another exemplary embodiment of the present invention tries to prevent an overload of a lighting apparatus and its damage even when it receives a DC input voltage.

In one or more exemplary embodiments, a circuit for driving a lighting apparatus includes a valley signal generator configured to generate a valley signal based on an input voltage, an input voltage determining unit configured to determine whether the input voltage corresponds to a direct voltage or a full-wave rectified AC voltage based on the valley signal, an AC voltage simulation unit configured to generate a virtual valley signal when the input voltage is a DC voltage, and a switching device controller configured to control a switching device used to drive an LED module based on the valley signal or virtual valley signal.

In another exemplary embodiment, the circuit for driving a lighting apparatus may further include a driving voltage controller configured to receive a reference voltage from the outside and a driving voltage from a driving current sensing device to control the driving voltage based on the reference voltage.

In another exemplary embodiment, the valley signal generator may include an input voltage detection module configured to receive an input signal from an external power supply to detect the input voltage, a comparison module configured to compare the input voltage having a first voltage range and an internal reference voltage having a second voltage range to output a voltage having a third voltage range, and a noise removal module configured to receive an output voltage of the comparison module and an internal clock signal to remove a noise of the valley signal through a plurality of noise filters each period of the internal clock signal.

In another exemplary embodiment, the valley signal generator may generate a first valley signal that is output in a high level and a low level when the input voltage corresponds to an AC voltage, and a second valley that is output in a high level when the input voltage corresponds to a DC voltage.

In one embodiment, the AC voltage simulation unit may substitute the virtual valley signal for the second valley signal.

In one embodiment, the switching device controller may enable a driving current to flow to an inductor when the switching device is turned on, and a current charged in the inductor to flow to an LED module through a diode when the switching device is turned off.

In some embodiments, a method for driving a lighting apparatus includes (a) generating a valley signal based on an input voltage; (b) determining whether the input voltage corresponds to a direct voltage or a full-wave rectified AC voltage based on the valley signal; (c) generating a virtual valley signal when the input voltage is a DC voltage; and (d) controlling a switching device used to drive an LED module based on the valley signal or virtual valley signal.

In one embodiment, the method for driving a lighting apparatus may further include (e) receiving a reference voltage from the outside and a driving voltage from a driving current sensing device to control the driving voltage based on the reference voltage.

In one embodiment, the step (a) may include (a-1) receiving an input signal from an external power supply to detect the input voltage; (a-2) comparing the input voltage having a first voltage range and an internal reference voltage having a second voltage range to output a voltage having a third voltage range; and (a-3) receiving an output voltage of the step (a-2) and an internal clock signal to remove a noise of the valley signal through a plurality of noise filters.

In one embodiment, the step (d) may include enabling a driving current to flow to an inductor when the switching device is turned on, and a current charged in the inductor to flow to an LED module through a diode when the switching device is turned off.

The disclosed technology and one or more exemplary embodiments may provide different effects. However, it does not mean that a specific embodiment should include all the following effects or only the following effects. Technical scopes of the disclosed technology should not be appreciated to be limited thereto.

Particularly, one or more exemplary embodiments may include a circuit for driving a lighting apparatus and the method therefor where it may be possible to drive a lighting apparatus by selecting an AC input voltage or DC input voltage automatically without any separate apparatus. Further, in a circuit for driving a lighting apparatus and a method thereof in accordance with one or more exemplary embodiments, it may be possible to prevent an overload of a lighting apparatus and any related damage even when it receives a DC voltage.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A circuit for driving a lighting apparatus, comprising:
    a valley signal generator configured to generate a valley signal based on an input voltage;
    an input voltage determining unit configured to determine whether the input voltage corresponds to a direct current (DC) voltage or a full-wave rectified AC voltage based on the valley signal;
    an AC voltage simulation unit configured to generate a virtual valley signal when the input voltage is a DC voltage; and
    a switching device controller configured to control a switching device used to drive an LED module based on a result of the determination by the input voltage determining unit and at least one of the valley signal and the virtual valley signal.

2. The circuit for driving a lighting apparatus of claim 1, further comprising:
    a driving voltage controller configured to receive a reference voltage from an external source and a driving voltage from a driving current sensing device, and control the driving voltage based on the reference voltage.

3. The circuit for driving a lighting apparatus of claim 1, wherein the valley signal generator comprises:
    an input voltage detection module configured to receive an input signal from an external power supply to detect the input voltage;
    a comparison module configured to compare the input voltage having a first voltage range and an internal reference voltage having a second voltage range to output a voltage having a third voltage range; and
    a noise removal module configured to receive an output voltage of the comparison module and an internal clock signal, and remove noise from the valley signal through a plurality of noise filters at each period of the internal clock signal.

4. The circuit for driving a lighting apparatus of claim 3, wherein the valley signal generator is further configured to generate a first valley signal that is output in a high level and a low level when the input voltage corresponds to an AC voltage, and a second valley signal that is output in a high level when the input voltage corresponds to a DC voltage.

5. The circuit for driving a lighting apparatus of claim 4, wherein the AC voltage simulation unit is further configured to substitute the virtual valley signal for the second valley signal.

6. The circuit for driving a lighting apparatus of claim 1, wherein the switching device controller is further configured to enable a driving current to flow to an inductor when the switching device is turned on, and enable a current charged in the inductor to flow to an LED module through a diode when the switching device is turned off.

7. A method for driving a lighting apparatus, comprising:
    generating a valley signal based on an input voltage;
    determining whether the input voltage corresponds to a direct current (DC) voltage or a full-wave rectified AC voltage based on the valley signal;
    generating a virtual valley signal when the input voltage is a DC voltage; and
    controlling a switching device used to drive an LED module based on a result of the determining and at least one of the valley signal and the virtual valley signal.

8. The method for driving a lighting apparatus of claim 7, further comprising:
    receiving a reference voltage from an external source and a driving voltage from a driving current sensing device to control the driving voltage based on the reference voltage.

9. The method for driving a lighting apparatus of claim 7, wherein generating a valley signal based on an input voltage comprises:
    receiving an input signal from an external power supply to detect the input voltage;
    comparing the input voltage having a first voltage range and an internal reference voltage having a second voltage range to output a voltage having a third voltage range; and
    receiving the output voltage having the third voltage range and an internal clock signal, and removing noise from the valley signal through a plurality of noise filters.

10. The method for driving a lighting apparatus of claim 7, wherein controlling the switching device used to drive an LED module based on the result of the determining and at least one of the valley signal and virtual valley signal comprises:
    enabling a driving current to flow to an inductor when the switching device is turned on; and
    enabling a current charged in the inductor to flow to an LED module through a diode when the switching device is turned off.

11. A lighting circuit comprising:
    a driving circuit configured to generate a valley signal in response to receiving an AC voltage and a virtual valley signal in response to receiving a DC voltage, and control a switching device that provides a driving current when switched on based on at least one of the valley signal and the virtual valley signal; and
    a light emitting diode (LED) unit configured to receive the driving current at an inductor when the switching device is switched on, wherein the inductor acts as a current source to an LED module when the switching device is switched off.

12. The lighting circuit of claim 11, wherein the driving circuit further comprises:
a valley signal generator configured to generate the valley signal based on when the AC voltage is received;
an input voltage determining unit configured to determine whether an input voltage corresponds to the AC voltage or the DC voltage based on the valley signal, wherein the AC voltage is a full-wave rectified AC voltage;
an AC voltage simulation unit configured to generate the virtual valley signal based on the determination that the DC voltage is received; and
a switching device controller configured to control the switching device used to drive the LED module based on a result of the determination by the input voltage determining unit and at least one of the valley signal and the virtual valley signal.

13. The lighting circuit of claim 11, wherein the driving circuit further comprises:
a driving voltage controller configured to receive a reference voltage from an external source and a driving voltage from a driving current sensing device, and control the driving voltage based on the reference voltage.

14. The lighting circuit of claim 12, wherein the valley signal generator comprises:
an input voltage detection module configured to receive an input signal from an external power supply to detect the input voltage;
a comparison module configured to compare the input voltage having a first voltage range and an internal reference voltage having a second voltage range to output a voltage having a third voltage range; and
a noise removal module configured to receive an output voltage of the comparison module and an internal clock signal, and remove noise from the valley signal through a plurality of noise filters at each period of the internal clock signal.

\* \* \* \* \*